(12) United States Patent
Featonby et al.

(10) Patent No.: US 12,443,424 B1
(45) Date of Patent: Oct. 14, 2025

(54) GENERATIONAL MANAGEMENT OF COMPUTE RESOURCE POOLS

(71) Applicant: Amazon Technologies, Inc., Seattle, WA (US)

(72) Inventors: Malcolm Featonby, Sammamish, WA (US); Saloni Sonpal, Seattle, WA (US); Axel David Velazquez, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 621 days.

(21) Appl. No.: 17/301,258

(22) Filed: Mar. 30, 2021

(51) Int. Cl.
  *G06F 9/455* (2018.01)
  *G06F 9/50* (2006.01)

(52) U.S. Cl.
  CPC ........ *G06F 9/45558* (2013.01); *G06F 9/5077* (2013.01); *G06F 2009/45562* (2013.01); *G06F 2209/5011* (2013.01)

(58) Field of Classification Search
  None
  See application file for complete search history.

(56) References Cited

U.S. PATENT DOCUMENTS

| | | | |
|---|---|---|---|
| 7,844,480 | B2 | 11/2010 | Ricketts |
| 8,898,402 | B1 | 11/2014 | Stronge |
| 9,110,496 | B1 | 8/2015 | Michelsen |
| 9,152,441 | B2 | 10/2015 | Anderson |
| 9,164,802 | B2 | 10/2015 | Netto |
| 9,256,467 | B1 | 2/2016 | Singh et al. |
| 9,549,038 | B1 | 1/2017 | Anne |
| 9,667,498 | B2 | 5/2017 | Wu et al. |
| 9,690,622 | B1 | 6/2017 | Argenti et al. |
| 9,848,041 | B2 | 12/2017 | Einkauf et al. |
| 9,898,347 | B1 | 2/2018 | Gupta |
| 9,910,713 | B2 | 3/2018 | Wisniewski et al. |
| 9,928,108 | B1 | 3/2018 | Wagner et al. |
| 9,971,621 | B1 | 5/2018 | Berg et al. |

(Continued)

OTHER PUBLICATIONS

U.S. Appl. No. 16/217,454, filed Dec. 12, 2018, Aithal et al.

(Continued)

*Primary Examiner* — Anil Khatri
*Assistant Examiner* — Melissa A Headly
(74) *Attorney, Agent, or Firm* — Knobbe, Martens, Olson & Bear, LLP

(57) ABSTRACT

Provided is a system for managing a pool of compute resources usable to execute user codes such as containerized software applications. The pool may include a plurality of sub-pools of compute instances that are each suited to handle a specific type of code execution requests and/or a specific set of capacity or resource configurations. For example, when a code execution request is received, the system may determine compute capacity from which sub-pool would be best suited to handle the request, and direct the request to that sub-pool (or execute the user code using compute capacity from that sub-pool). Each sub-pool may be assigned a generational indicator that indicates its level of use (e.g., rarely used, moderately use, frequently used, etc.) and/or its age (e.g., brand new, young, old, etc.). As a sub-pool experiences continued use, the sub-pool may be promoted and its retention/replenishment policy may be updated accordingly.

20 Claims, 7 Drawing Sheets

(56) References Cited

U.S. PATENT DOCUMENTS

| | | |
|---|---|---|
| 9,983,796 B2 | 5/2018 | Yang et al. |
| 10,067,785 B1* | 9/2018 | Wei .................. G06F 9/505 |
| 10,067,801 B1* | 9/2018 | Wagner ............... G06F 9/5055 |
| 10,135,712 B2 | 11/2018 | Wu et al. |
| 10,191,778 B1 | 1/2019 | Yang et al. |
| 10,310,966 B1 | 6/2019 | Ge et al. |
| 10,397,255 B1 | 8/2019 | Bhalotra et al. |
| 10,432,551 B1 | 10/2019 | Vosshall et al. |
| 10,581,964 B2 | 3/2020 | Einkauf et al. |
| 10,606,646 B1 | 3/2020 | Christensen |
| 10,606,660 B1 | 3/2020 | Hartley et al. |
| 10,771,337 B1 | 9/2020 | Das et al. |
| 10,824,474 B1 | 11/2020 | Kamboj et al. |
| 10,871,995 B2 | 12/2020 | Gerdesmeier et al. |
| 10,901,764 B2 | 1/2021 | Tegtmeier et al. |
| 11,385,938 B2 | 7/2022 | Kim |
| 11,392,422 B1 | 7/2022 | Filiz et al. |
| 11,403,150 B1 | 8/2022 | Featonby et al. |
| 11,422,844 B1 | 8/2022 | Filiz et al. |
| 11,449,355 B2 | 9/2022 | Jin et al. |
| 11,487,591 B1 | 11/2022 | Featonby |
| 11,573,816 B1 | 2/2023 | Featonby et al. |
| 11,797,287 B1 | 10/2023 | Ghai et al. |
| 11,853,807 B1 | 12/2023 | Coult et al. |
| 11,892,418 B1 | 2/2024 | Featonby et al. |
| 11,989,586 B1 | 5/2024 | Srikanta et al. |
| 11,995,466 B1 | 5/2024 | Srikanta et al. |
| 12,190,144 B1 | 1/2025 | Featonby et al. |
| 2005/0002375 A1 | 1/2005 | Gokhale et al. |
| 2008/0282267 A1 | 11/2008 | Adam et al. |
| 2011/0246515 A1 | 10/2011 | Johnson et al. |
| 2012/0179824 A1 | 7/2012 | Jackson |
| 2012/0210326 A1 | 8/2012 | Torr et al. |
| 2012/0233668 A1 | 9/2012 | Leafe et al. |
| 2013/0124807 A1 | 5/2013 | Nielsen et al. |
| 2013/0160008 A1 | 6/2013 | Cawlfield et al. |
| 2013/0238785 A1 | 9/2013 | Hawk et al. |
| 2013/0297964 A1 | 11/2013 | Hegdal et al. |
| 2013/0318132 A1* | 11/2013 | Basu .................. G06F 12/0276 707/816 |
| 2014/0079207 A1 | 3/2014 | Zhakov et al. |
| 2014/0358710 A1 | 12/2014 | Balestrieri et al. |
| 2014/0366093 A1 | 12/2014 | Oh et al. |
| 2015/0106805 A1 | 4/2015 | Melander et al. |
| 2015/0142878 A1 | 5/2015 | Hebert et al. |
| 2016/0077846 A1 | 3/2016 | Phillips et al. |
| 2016/0112497 A1 | 4/2016 | Koushik et al. |
| 2016/0274928 A1 | 9/2016 | Linton et al. |
| 2016/0323377 A1 | 11/2016 | Einkauf et al. |
| 2016/0378559 A1 | 12/2016 | Bhandarkar et al. |
| 2017/0060621 A1 | 3/2017 | Whipple et al. |
| 2017/0063659 A1 | 3/2017 | Platon et al. |
| 2017/0078433 A1 | 3/2017 | Radhakrishnan et al. |
| 2017/0090960 A1 | 3/2017 | Anderson et al. |
| 2017/0090961 A1 | 3/2017 | Wagner et al. |
| 2017/0115978 A1 | 4/2017 | Modi et al. |
| 2017/0140526 A1 | 5/2017 | Chen et al. |
| 2017/0177413 A1 | 6/2017 | Wisniewski et al. |
| 2017/0177860 A1 | 6/2017 | Suarez et al. |
| 2017/0177877 A1 | 6/2017 | Suarez et al. |
| 2017/0180346 A1 | 6/2017 | Suarez et al. |
| 2017/0339158 A1 | 11/2017 | Lewis et al. |
| 2017/0339196 A1 | 11/2017 | Lewis et al. |
| 2017/0371703 A1 | 12/2017 | Wagner et al. |
| 2017/0372703 A1 | 12/2017 | Wagner et al. |
| 2018/0004503 A1 | 1/2018 | OlmstedThompson |
| 2018/0088993 A1 | 3/2018 | Gerdesmeier et al. |
| 2018/0101403 A1 | 4/2018 | Baldini Soares et al. |
| 2018/0129539 A1 | 5/2018 | Sadat |
| 2018/0150325 A1 | 5/2018 | Kuo et al. |
| 2018/0246745 A1 | 8/2018 | Aronovich et al. |
| 2018/0267990 A1 | 9/2018 | Cherukuri et al. |
| 2018/0278639 A1 | 9/2018 | Bernstein et al. |
| 2018/0285204 A1 | 10/2018 | Dwarampudi et al. |
| 2018/0331971 A1 | 11/2018 | Certain et al. |
| 2018/0336345 A1 | 11/2018 | Georgiev |
| 2019/0050680 A1 | 2/2019 | Waugh et al. |
| 2019/0079788 A1 | 3/2019 | Ruty et al. |
| 2019/0102231 A1 | 4/2019 | Wagner |
| 2019/0108049 A1 | 4/2019 | Singh et al. |
| 2019/0146772 A1 | 5/2019 | Griffin et al. |
| 2019/0146774 A1 | 5/2019 | Moore et al. |
| 2019/0149406 A1 | 5/2019 | Fratini |
| 2019/0188107 A1 | 6/2019 | Alston et al. |
| 2019/0243681 A1 | 8/2019 | Chen |
| 2019/0294477 A1 | 9/2019 | Koppes et al. |
| 2019/0303274 A1 | 10/2019 | Funnell et al. |
| 2019/0324786 A1 | 10/2019 | Ranjan et al. |
| 2019/0340033 A1 | 11/2019 | Ganteaume |
| 2019/0342266 A1 | 11/2019 | Ramachandran et al. |
| 2019/0347127 A1 | 11/2019 | Coady et al. |
| 2019/0391834 A1 | 12/2019 | Mullen |
| 2019/0392045 A1 | 12/2019 | De Lima Junior et al. |
| 2020/0051017 A1 | 2/2020 | Dujmic |
| 2020/0073649 A1 | 3/2020 | Viana et al. |
| 2020/0084202 A1 | 3/2020 | Smith et al. |
| 2020/0133718 A1 | 4/2020 | Koehler et al. |
| 2020/0142711 A1 | 5/2020 | Varda et al. |
| 2020/0174842 A1 | 6/2020 | Wang et al. |
| 2020/0174844 A1* | 6/2020 | Bergsma ............... G06F 9/5077 |
| 2020/0210227 A1 | 7/2020 | Xie et al. |
| 2020/0213279 A1 | 7/2020 | Xiong et al. |
| 2020/0225983 A1 | 7/2020 | Jung et al. |
| 2020/0241930 A1 | 7/2020 | Garg et al. |
| 2020/0249977 A1 | 8/2020 | Mentz et al. |
| 2020/0310845 A1 | 10/2020 | Liguori et al. |
| 2020/0310850 A1 | 10/2020 | Liguori et al. |
| 2020/0356387 A1 | 11/2020 | Anwar et al. |
| 2020/0358719 A1 | 11/2020 | Mestery et al. |
| 2020/0412596 A1 | 12/2020 | Cherunni |
| 2021/0019179 A1 | 1/2021 | Yadav et al. |
| 2021/0064442 A1 | 3/2021 | Alluboyina et al. |
| 2021/0089361 A1 | 3/2021 | Rafey et al. |
| 2021/0109775 A1 | 4/2021 | Shen et al. |
| 2021/0117217 A1 | 4/2021 | Croteau et al. |
| 2021/0141655 A1 | 5/2021 | Gamage et al. |
| 2021/0144517 A1 | 5/2021 | Guim et al. |
| 2021/0158083 A1 | 5/2021 | Gan et al. |
| 2021/0160162 A1 | 5/2021 | Abbas |
| 2021/0184942 A1 | 6/2021 | Tootaghaj et al. |
| 2021/0191748 A1 | 6/2021 | Ito |
| 2021/0232344 A1 | 7/2021 | Corrie |
| 2021/0311764 A1 | 10/2021 | Rosoff et al. |
| 2021/0357255 A1 | 11/2021 | Mahadik et al. |
| 2022/0035646 A1 | 2/2022 | Ibryam |
| 2022/0188167 A1 | 6/2022 | Iyer et al. |
| 2022/0229651 A1 | 7/2022 | Wu et al. |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.
Chavan, et al., "Clustered Virtual Machines for Higher Availability of Resources with Improved Scalability in Cloud Computing," 2014 IEEE, pp. 221-225.
Chen, et al., "Virtual Cluster: Customizing the Cluster Environment through Virtual Machines," 2008 IEEE, pp. 411-416.
Dettori, "Blueprint for Business Middleware as a Managed Cloud Service", IEEE International Conference on Cloud Engineering, 2014, pp. 261-270.
Sharifi, et al., "VCE: A New Personated Virtual Cluster Engine for Cluster Computing," 2008 IEEE, 6 pages.

* cited by examiner

GENERATIONAL MANAGEMENT OF COMPUTE RESOURCE POOLS

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

Figure 1:
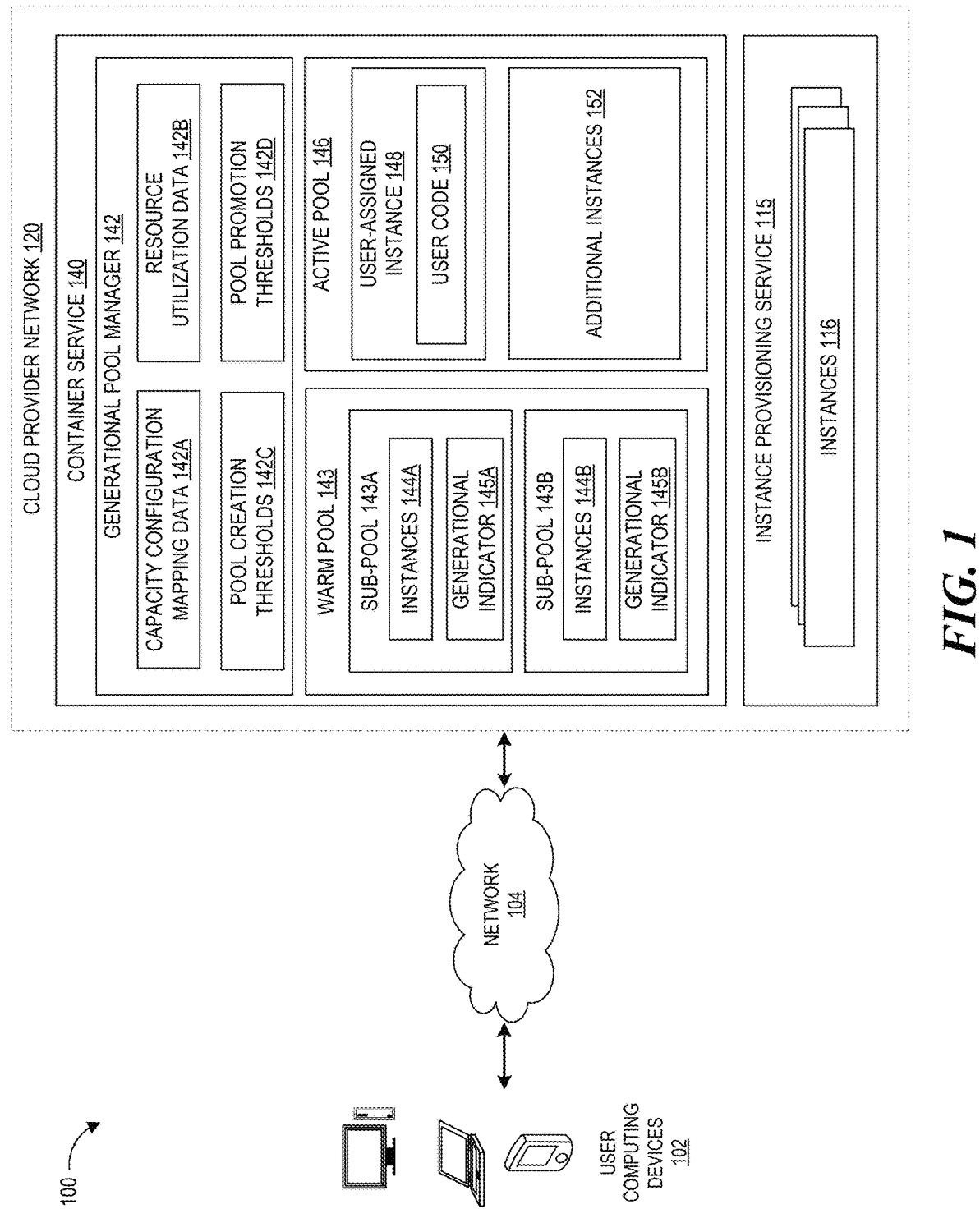
FIG. 1 depicts a schematic diagram of a network environment in which a cloud provider network is used to implement a container service and a generational pool manager in accordance with aspects of the present disclosure.

The present disclosure relates to techniques for warm pool management for cloud based serverless container orchestration. A developer can package a software application and everything else needed to run the application in a container image (e.g., a standalone, executable package of software that includes everything needed to run an application process) and send a request to a distributed computing environment, such as a cloud provider network, to execute the application using compute capacity provided by the cloud provider network.

To handle such execution requests, the cloud provider network may allow its users to manage the underlying compute capacity (e.g., virtual machines provided by the cloud provider network) that is used to execute their containerized applications. For example, the cloud provider network may allow these users to set up their own virtual machines that can be used to execute their containerized applications. In such cases, the users may have control over the number of compute instances ready to be used to execute their applications, and the users may need to monitor the utilization levels of the compute instances to scale them in and out as needed. However, having to maintain and scale the compute instances can be quite burdensome to the users and may result in inefficient use of the underlying computing resources.

Alternatively, the cloud provider network may provide "serverless" compute capacity in a manner that abstracts away the underlying infrastructure, enabling, by managing and scaling the clusters of compute capacity on their behalf, the users to simply focus on their containerized applications. "Serverless," as used herein, refers to a cloud computing experience wherein a customer provides code to be executed in the cloud provider network, but does not have to provision or manage the underlying server resources (e.g., virtual machines, bare-metal servers), which are instead managed by a service of the cloud provider network and may not even be listed as resources in the customer's account.

To provide such serverless compute capacity, the cloud provider network may maintain a pool of pre-warmed (e.g., pre-booted and pre-initialized with operating systems, language runtimes, and/or other software components needed to initiate code execution) compute instances that can be used to execute applications on behalf of the users. On one hand, if the cloud provider network maintains an insufficient amount of compute capacity in the pool, the cloud provider network may need to either deny an incoming execution request, in which case the user may need to re-submit the request at a later time, or acquire and initialize additional compute capacity before executing the user application using the additional compute capacity, which would increase the latency associated with the request (e.g., the time elapsed between receiving the request and initiating the requested execution). Both of these cases would degrade the user experience. On the other hand, if the cloud provider network maintains an excessive amount of compute capacity in the pool, the amount of unused compute capacity would increase, driving up the cost of providing the serverless code execution service, which would also be undesirable for the users of the service. The variability and unpredictability of the number of incoming code execution requests at any given time renders the task of maintaining a sufficient, but not excessive, amount of compute capacity in the pool very challenging.

These aforementioned challenges, among others, are addressed in some embodiments by the disclosed techniques for generational management of compute resource pools. These techniques enable optimization of pools based on actual usage rather than anticipated usage. Based on the capacity configurations (e.g., a combination of computing resources such as CPUs or virtual CPUs (vCPUs), memory, disk, etc.) specified by incoming code execution requests and/or the performance of the compute capacity assigned to such requests, the cloud provider network can create new pools (e.g., to improve utilization) and promote existing pools that experience consistent use (e.g., to improve availability and latency performance).

As will be appreciated by one of skill in the art in light of the present disclosure, the embodiments disclosed herein improve the ability of computing systems, such as container systems, code execution systems, and compute resource management systems, to provide mechanisms for managing compute resource usage and availability based on actual usage on a cloud provider network. By maintaining multiple generations of pools with different capacity retention and replenishment policies and allowing the pools to be promoted or demoted to a different generation based on actual usage, the cloud provider network of the present disclosure can address the deficiencies described above.

Prior techniques generally relied on anticipating the user demand for different types of capacity configurations and trying to provide a sufficient amount of pre-warmed compute capacity to satisfy the anticipated user demand. However, such approaches can limit the number of capacity configuration options made available to the users, because if a given capacity configuration has a low likelihood of being used, it may not be offered to avoid having to maintain pre-warmed compute capacity that can accommodate such a capacity configuration. If such capacity configurations were offered, the compute capacity maintained in the pool to accommodate such capacity configurations would be under-utilized, thereby increasing the cost associated with maintaining the compute capacity.

In contrast, embodiments of the present disclosure enable generational management of compute resource pools based on actual usage such that a pool of compute capacity is promoted to the next generation (e.g., from brand new or Eden space generation to young or survivor space generation, to old or permanent generation) as the pool experiences continued usage, where the different generations may have different retention and replenishment policies suited for the respective generations.

By doing so, the generational pool management techniques (i) reduce the burden of having to maintain compute capacity that can accommodate all types of capacity configurations offered by the cloud provider network but may or may not be utilized in actuality, thereby increasing cost savings that can be passed onto the customers as well as allowing a greater number of capacity configurations to be offered to the customers (not all capacity configurations, and (ii) increase the likelihood that more frequently used types of compute capacity would be more likely to be available in the pool in a pre-warmed state, thereby improving the launch latency performance.

The presently disclosed embodiments therefore address technical problems inherent within computing systems, such as optimizing the management of compute resource pools. These technical problems are addressed by the various technical solutions described herein, including generational management of compute resource pools. Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service

FIG. 1 depicts an example computing environment 100 including a cloud provider network 120 in which the disclosed container service can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for managing generational pools of compute resources may be implemented in non-elastic computing environments as well.

The cloud provider network 120 can be accessed by user computing devices 102 over a network 104. The cloud provider network 120 may include a container service 140 (which may be a serverless container service) and an instance provisioning service 115 that are in networked communication with one another and with the network 104 to provide users with on-demand access to the services and resources provided by the cloud provider network 120. As used herein, the term "resource," in addition to its ordinary meaning, may refer to a form of compute capacity configurable and/or usable to execute a piece of code provided or specified by a user. For example, a resource may include, but are not limited to, a virtual machine (VM) instance, a bare-metal instance, a microVM, a physical machine, a container, a node, and/or an offload card, which are described in greater detail below. In some embodiments, the term "resource" is used interchangeably with instance, compute instance, or compute capacity.

The container service 140 provides a generational pool manager 142, a warm pool 143, and an active pool 146. The warm pool 143 refers to a set of virtual machine instances that have been launched and pre-configured for running containers, for example by having installed within the virtual machine a container runtime and container agent. The instances of the warm pool can be launched from a snapshot or machine image of a suitably configured virtual machine. The serverless container service 140 can provide multiple warm pools corresponding to different types of instances such that a particular container or task can be launched on a suitable instance (e.g., a warm pool of GPU instances for use in launching a task requiring GPU resources). Providing a warm pool 143 can reduce the amount of time required to launch a container launch, compared to a launch workflow that launches both the virtual machine and the container, which may be particularly beneficial for customers launching short-lived containers (e.g., containers that run for approximately two minutes or less).

The generational pool manager 142 keeps the warm pool 143 replenished so that the warm pool 143 includes compute capacity (e.g., a number of pre-warmed compute instances) sufficient to handle incoming requests for compute capacity (e.g., to be used to execute user codes). When a code execution request is received, the generational pool manager 142 may select an appropriate compute instance from the warm pool 143 (e.g., using capacity configuration mapping data 142A), and use the compute instance to execute a user code indicated by the code execution request. As instances are removed from the warm pool 143 to handle incoming requests, the generational pool manager 142 may add additional instances (e.g., those obtained from the instance provisioning service 115) to the warm pool 143. Additionally, the generational pool manager 142 may monitor resource utilization data 142B to create or remove sub-pools in the warm pool 143 (e.g., when one or more of the pool creation thresholds 142C are satisfied) and promote or demote sub-pools in the warm pool 143 (e.g., when one or more of the pool promotion thresholds 142D are satisfied).

One or more of the capacity configuration mapping data 142A, the resource utilization data 142B, the pool creation thresholds 142C, and the pool promotion thresholds 142D may be region-specific (e.g., maintained separately for each region, zone, state, country, etc.) and/or user-account-specific (e.g., maintained separately for each user account or each user account class/type).

The capacity configuration mapping data 142 may map the capacity configurations that can be specified in the incoming code execution requests to the compute capacity available (or to be made available) in the warm pool 143. In some embodiments, the capacity configuration can be specified in a code execution request as one of a finite set of combinations offered by the container server 140, and the capacity configuration mapping data 142 may map each one of the combinations in the finite set to one or more instances, instance types, and/or sub-pools provided in the warm pool 143. For example, the container service 140 may offer 3 capacity configurations: (i) a virtual machine having 1 CPU, 4 GBs of memory, and 16 GBs of disk space; (i) a virtual machine having 1 CPU, 4 GBs of memory, and 512 GBs of disk space; and (i) a virtual machine having 4 CPU, 16 GBs of memory, 512 GBs of disk space. Each of configurations (i)-(iii) may be mapped to one or more sub-pools (each to a different sub-pool, or multiple configurations to the same sub-pool). In other embodiments, the capacity configuration can be specified in a code execution request in a flexible, open-ended manner, and the capacity configuration mapping data 142 may map a range of capacity configurations to one or more instances, instance types, and/or sub-pools provided in the warm pool 143. Although CPU, memory, and disk space are used as examples, the capacity configurations may include any combinations of these and other computing resources such as network bandwidth, storage volume bandwidth, GPU, GPU peer to peer, etc. as well as compute capacity types such as general purpose, compute optimized, memory optimized, accelerate computing, storage optimized, etc. which may affect the distribution and proportion of the different types of resources.

The resource utilization data 142B may include per-instance utilization levels of the user-assigned instances 148 (e.g., what percentage of the computing resources such as CPU, memory, disk etc. available on a user assigned instance 148 is being used by the user code 150 being executed on the user-assigned instance 148). The resource utilization data 142B may also include the usage statistics of the sub-pools within the warm pool 143 (e.g., how frequently the compute capacity in a given sub-pool is being utilized, such as the number of code execution requests handled using instances from the sub-pool in the last hour/day/week/month). The resource utilization data 142B may also include per-pool utilization levels that indicate, for a given pool or sub-pool, what percentage of the compute instances are being used. For example, a pool may maintain 10 compute instances, and if 6 are being used to execute user code, and 4 are in an idle state waiting to be used for future code execution requests, the resource utilization data 142B may indicate that the pool has a per-pool utilization level of 60%.

The pool creation thresholds 142C may include one or more thresholds or conditions that, when satisfied by the resource utilization data 142B, cause a new pool or sub-pool to be created within the warm pool 143. For example, the resource utilization data 142B may indicate that the sub-pool 143 includes a set of instances that are executing a particular user code, and that the particular user code is using only 40% of the resources available on each instance in the set. The pool creation thresholds 142C may include a pool creation threshold that specifies, if the resource utilization falls below 50% for a threshold number of instances (or for a threshold number of code execution requests) in an existing sub-pool, a new sub-pool including instances that are smaller than those in the existing sub-pool should be created. In this example, the generational pool manager 142 may create such a new sub-pool based on the resource utilization being 40% for the set of instances, and update the capacity configuration mapping data 142A such that any requests that would have been handled by the existing sub-pool (e.g., the requests that caused the particular user code to be executed on the set of instances) would now be handled by the new sub-pool, which has smaller instances, thereby resulting in higher resource utilization.

The pool creation thresholds 142C may also include one or more thresholds or conditions that, when satisfied by the resource utilization data 142B, cause an existing pool or sub-pool to be removed from the warm pool 143. For example, the resource utilization data 142B may indicate that the sub-pool 143 includes a set of instances that are executing a particular user code, and that the particular user code is using only 40% of the resources available on each instance in the set. The pool creation thresholds 142C may include a pool removal threshold that specifies, if the resource utilization falls below 50% for a threshold number of instances (or for a threshold number of code execution requests) in an existing sub-pool, and there exists another sub-pool with instances that are smaller than those in the existing sub-pool, the existing sub-pool should be removed. In this example, the generational pool manager 142 may remove the existing sub-pool based on the resource utilization being 40% for the set of instances and there being another sub-pool that can handle the code execution requests currently being handled by the existing sub-pool. The generational pool manager 142 may also update the capacity configuration mapping data 142A such that any requests that would have been handled by the existing sub-pool (e.g., the requests that caused the particular user code to be executed on the set of instances) would now be handled by one or more other sub-pools within the warm pool 143, which include smaller instances, thereby resulting in higher resource utilization.

The pool promotion thresholds 142D may include one or more thresholds or conditions that, when satisfied by the resource utilization data 142B associated with a pool or sub-pool, cause the pool or sub-pool to be promoted to a higher generational state. The pool promotion thresholds 142D may also include one or more thresholds or conditions that, when satisfied by the resource utilization data 142B associated with a pool or sub-pool, cause the pool or sub-pool to be demoted to a lower generational state. For example, the pool promotion thresholds may be time-based such that they are satisfied as the pool or sub-pool gets older. As another example, the pool promotion thresholds may be usage-based such that they are satisfied as the pool or sub-pool experiences more use or as their usage per time window (e.g., the number of requests handled by the pool or sub-pool per for the last hour/day/week/month or the number of instances withdrawn or used from the pool or sub-pool in the last hour/day/week/month) increases. Various examples of the generation states are described in greater detail below with reference to the warm pool 143.

In some embodiments, when the container service 140 takes an action with respect to a pool (e.g., creates a new pool, removes an existing pool, promotes an existing pool, demotes an existing pool, etc.), the pool may be associated with a time window during which the action cannot be reversed. For example, a newly created pool may be assigned a time period during which the pool cannot be removed (e.g., to ensure that the new pool has had a sufficient opportunity to develop a threshold level of usage before being removed). As another example, a newly promoted pool may be assigned a time period during which the pool cannot be demoted (e.g., to ensure that the pool has had a sufficient opportunity to operate at the higher generational state before being demoted). Additionally or alternatively, when the container service 140 determines that an action needs to be taken with respect to a pool (e.g., creates a new pool, removes an existing pool, promotes an existing pool, demotes an existing pool, etc.), the container service 140 may enter a validation period during which the container service 140 determines whether the decided action, if taken, would have improved the system (e.g., improve utilization, improve latency performance, and/or expand capacity configuration offerings). After the validation period, if the container service 140 determines that the decided action would have improved the system, the container service 140 may then take the decided action.

The warm pool 143 is a collection of instances that are ready to be used to handle incoming task launch/execution requests. As shown in FIG. 1, the warm pool 143 includes a sub-pool 143A including instances 144A and a generational indicator 145A and a sub-pool 143B including instances 144B and a generational indicator 145B. The instances 144A and instances 144B may have different sizes, different configurations, and/or different software components loaded thereon. In some cases, each sub-pool may include instances having the same capacity configuration type. For example, the sub-pool 143A may include instances having 1 CPU, 4 GBs of memory, and 256 GBs of disk space, and sub-pool 143B may include instances having 2 CPUs, 2 GBs of memory, and 256 GBs of disk space. In other cases, each sub-pool may include instances having a range of capacity configuration types. For example, the sub-pool 143A may include instances having 1-2 CPUs (e.g., 1 CPU, 1.5 CPUs, 2 CPUs, or any other amount of CPU within the range), 1-4 GBs of memory (e.g., 1 GB, 2 GBs, 4 GBs, or any other amount of memory within the range) and 4-512 GBs of disk space (4 GBs, 128 GBs, 512 GBs, or any other amount of disk space within the range), and the sub-pool 143B may include instances having 4-8 CPUs (e.g., 4 CPUs, 6 CPUs, 8 CPUs, or any other amount of CPU within the range), 8-32 GBs of memory (e.g., 8 GBs, 16 GBs, 32 GBs, or any other amount of memory within the range), and 1-4 TBs of disk space (1 TB, 2 TBs, 4 TBs, or any other amount of disk space within the range). Although two sub-pools are shown in FIG. 1, a fewer or greater number of sub-pools may be created or maintained in the warm pool 143, for example, according to the pool creation thresholds 142C.

The generational indicators 145A and 145B may indicate a generational state of the sub-pools 143A and 143B, respectively. For example, the generational state indicated by the generational indicators 145A and 145B may be one of (i) brand new or Eden space generation, (ii) young or survivor space generation, and (iii) old or permanent generation. As another example, the generational indicator may be a numerical value indicative of the length of time for which the corresponding sub-pool has been in existence and/or the level of use that the corresponding sub-pool is experiencing. In some embodiments, once a pool has reached a threshold level of usage, the pool may enter a special generational state (e.g., tenured generation) in which the pool can no longer be removed based on its utilization levels or other thresholds. In some cases, one or more pools may be designated as fallback pools and used to handle code execution requests that cannot be (or decided not to be) sent to any other pools in the warm pool 143. Such fallback pools may also not be removed based on their utilization levels or other thresholds.

The retention and/or replenishment policies associated with a sub-pool may depend or correspond to the generational state of the sub-pool. For example, a relatively young sub-pool that was recently created and has not experience a lot of use yet may be associated with a retention policy that favors terminating the compute instances in the sub-pool (or compute instances taken out from the sub-pool to execute user code thereon) relatively soon after they are done being used for executing user code thereon, and a replenishment policy that favors keeping a relatively few number of idle compute instances in the sub-pool in anticipation of future code execution requests that might use the idle compute instances in the sub-pool. In contrast, a relatively old sub-pool that continues to experience a high level of use may be associated with a retention policy that favors keeping the compute instances associated with the sub-pool around for a little longer after they are done being used for executing user code thereon (with the hope of being able to use them again to handle future code execution requests), and a replenishment policy that favors keeping a greater number of idle compute instances in anticipation of future code execution requests. As described above, the generational states may exist in discrete levels (e.g., brand new, young, and old) or in a more continuous spectrum (e.g., generation 1.0, generation 3.5, generation 5.4, and generation 9.8, etc.). As the sub-pool ages and experiences continued use, the sub-pool may move towards a higher/older generational state, and as the amount of use experienced by the sub-pool decreases over time, the sub-pool may move towards a lower/younger generational state. The retention and replenishment policies may gradually change as a sub-pool moves from one end of the spectrum to the other.

The active pool 146 is a collection of instances that have each been assigned to a corresponding user for executing a given task on behalf of the user. The container service 140 may receive a request for an instance that can be used to execute a task or user code specified in the request, and identify an instance that can be used to execute the task from the warm pool 143 (e.g., based on one or more configuration parameters specified in the request), and move the identified instance to the active pool 146 to initiate executing the task on behalf of the user of the task. For example, the user-assigned instance 148 is executing user code 150 on behalf of a user of the cloud provider network 120. Additional details relating to the warm pool 143 and the active pool 146 are provided, for example, in U.S. application Ser. No. 14/977,524 (U.S. Pat. No. 10,067,801; issued Sep. 4, 2018), titled "ACQUISITION AND MAINTENANCE OF COMPUTE CAPACITY," which is incorporated herein by reference in its entirety. Although the active pool 146 is shown in the example of FIG. 1, in other embodiments, the instance being used to execute the task or user code remains in the warm pool 143 and simply marked as being used to execute the task or user code on behalf of a user without being moved to a separate active pool.

The user code 150 may refer to one or more programs, applications, tasks, container images, routines, subroutines, threads, processes, modules, etc. written in a specific program language. Such user code may be executed to achieve a specific task, for example, in connection with a particular web application or mobile application developed by the user. For example, the user code may be written in JavaScript (node.js), Java, Python, Ruby, and/or any other programming language.

The instance provisioning service 115 provides instances 116 that can be used by the container service 140 to perform one or more of the techniques described herein. For example, the container service 140 may use the instance provisioning service 115 to provide the instances in the warm pool 143 and the active pool 146. The instance provisioning service 115 may provide resizable computing capacity (e.g., instances 116) to the container service 104 or users of the cloud provider network 120 for building and hosting their software systems. The instance provisioning service 115 and associated control plane functionality can provide an elastic compute cloud service of the cloud provider network 120. Compute resources can be provided from the instance provisioning service 115 to the container service 140 (or directly to users of the cloud provider network 120) via an elastic compute cloud service (referred to in various implementations as an elastic compute service, a virtual machines service, a computing cloud service, a compute engine, or a cloud compute service). The container service 140 can use the instance provisioning service 115 to launch as many virtual or physical computing environments, referred to as "instances," as they need. The instances can have various configurations of processing power, memory, storage, and networking capacity depending upon user needs. The instance provisioning service 115 can also include computer storage for temporary data used while an instance is running; however, as soon as the instance is shut down this data is lost.

The instance provisioning service 115 may provide the instances shown in FIG. 1 with varying computational and/or memory resources. In one embodiment, each of the instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), graphics processing units (GPUs), and/or other suitable descriptive characteristics. Each instance type can have a specific ratio of processing, local storage, memory, and networking resources, and different instance families may have differing types of these resources as well. Multiple sizes of these resource configurations can be available within a given instance type. Different instance families may be divided into different sub-pools as shown in FIG. 1. The instances shown in FIG. 1 may include one or more of physical machines, virtual machines, containers, nodes, or other forms of virtual or physical compute units that are configured to execute one or more applications, or any combination thereof.

In some implementations, at least a subset of virtualization management tasks may be performed at one or more offloading cards so as to enable more of the processing capacity of the host to be dedicated to client-requested compute instances—e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning an instance generally includes reserving resources (e.g., computational and memory resources) of an underlying physical machine (e.g., from a pool of available physical machines and other resources), installing or launching required software (e.g., an operating system), and making the instance available to a user for performing tasks specified by the client (e.g., by adding the instance to the warm pool 143 or a sub-pool thereof). After an instance is done being used (also referred to herein as being released) by the user, the instance can be torn down and re-provisioned back into the warm pool 143 or a sub-pool thereof for subsequent use by the user or another user of the cloud provider network 120.

Although some embodiments of the present disclosure are described with reference to the instances that are part of the cloud provider network 120, in other embodiments, the techniques described herein are applied to one or more instances that are outside the cloud provider network 120 (e.g., implemented using the user computing devices 102 and/or other on-premises computing resources of the users of the cloud provider network 120). Although not shown in FIG. 1, one or more of the instances shown in FIG. 1 may be part of one or more computing "clusters," which can include at least one cluster master (which runs control processes including scheduling, resource control, handling API requests, and deciding what runs on the cluster's nodes) and multiple nodes (e.g., compute instances that can run containerized applications and other workloads). These clusters can run across a number of physical machines in a distributed computing environment such as the cloud provider network 120.

The container service 140 may provide a set of application programming interfaces ("APIs") that can be used by the users of the user computing devices 102 to request compute resources and execute user code (e.g., tasks, program codes, container images, etc.) on the requested compute resources. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network 120, enabling the development of applications that interact with resources and services hosted in the cloud provider network 120. APIs can also enable different services of the cloud provider network 120 to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. The instances, as used herein, may include such virtual machines. For example, some containers can be run on virtual machines that are running a container agent, and some containers can be run on bare-metal servers.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of the cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Some implementations of the cloud provider network 120 can additionally include compute servers, object storage servers, block store servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone" or an "AZ") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable physical and/or virtual computing devices via their use of the instances illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for managing resource usage and limits can be implemented as part of a virtual compute service, container service, or Kubernetes-based container service in some embodiments.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Although some embodiments of the present disclosure describe an instance as being a virtual machine, an instance, as used herein, may refer to any one of a virtual machine instance, a bare-metal instance, a microVM, a physical machine, a container, a node, an offload card, or another unit of compute capacity configurable to execute user code. Such an instance may reside within the cloud provider network 120 or within an on-premises environment outside the cloud provider network 120. A pool of instances, as described herein (e.g., warm pool 143, active pool 146, or any sub-pools thereof), may include a single type of such instances, or a combination of two or more types of such instances.

Example Routine for Executing a User Code with Generational Pool Management

Figure 2:
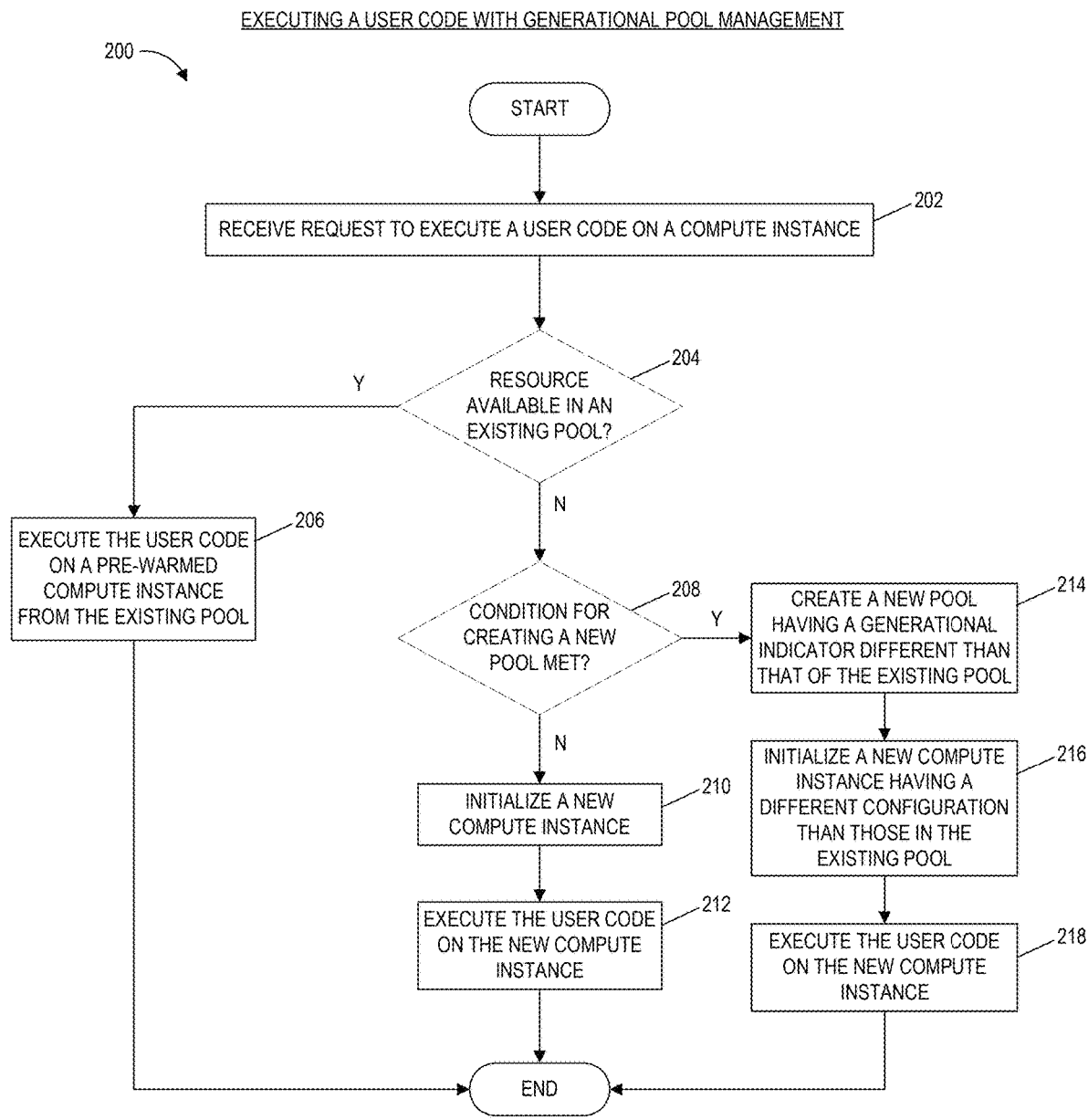
FIG. 2 is a flowchart of an example process for executing a user code with generational pool management in accordance with aspects of the present disclosure.

FIG. 2 depicts an illustrative routine 200 for executing a user code with generational pool management in accordance with aspects of the present disclosure. The routine 200 may be carried out, for example, by the container service 140 (or a component thereof such as the generational pool manager 142) or one or more other components of the cloud provider network 120 described herein. For convenience, some or all of the steps of the routine 200 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 200.

The routine 200 begins at block 202, at which the container service 140 receives a request to execute a user code on a compute instance provided by the cloud provider network 120. The request may include or indicate one or more of: (i) a user code to be executed by the container service 140, (ii) a capacity configuration requested for executing the user code, (iii) whether the user code is to be executed using compute capacity assigned to the user of the user code or on-demand/serverless compute capacity provided by the cloud network provider 120, (iv) configuration parameters to be used to execute the user code (e.g., arguments to be inputted to the user code, network settings to be configured, etc.), (v) location of the user code, and the like.

At block 204, the container service 140 determines whether there is a compute instance in an existing pool that can be used to execute the user code. If the container service 140 determines that there is a compute instance that can be used, the routine 200 proceeds to block 206, where the container service 140 executes the user code on a pre-warmed compute instance from the existing pool. Otherwise, the routine proceeds to block 208.

In some embodiments, regardless of the determination at block 204, the container service 140 may store certain data about the request received at block 202 and the state of the warm pool 143 at the time the request was received so that such data can be used for future determinations regarding how an incoming request should be handled by which pool or sub-pool and/or future determinations regarding whether a new pool or sub-pool should be created or removed. For example, if the request specified 21 GBs of memory is requested for executing the user code and the warm pool 143 only had a sub-pool of compute instances with 16 GBs of memory and a sub-pool of compute instances with 32 GBs of memory, the container service 140 may perform one of the following: (i) deny the request (e.g., based on there not being an available instance with at least 21 GBs of memory, or based on the closest amount of resources available on an available instance in the warm pool being more than 50% greater than 21 GBs of memory) and ask the user to retry or resend the code execution request at a later time (e.g., "we do not have compute capacity sufficient to handle this request, please try in 5 minutes"), (ii) send the request to the sub-pool of compute instances with 32 GBs of memory, based on the sub-pool having an available instance, despite 32 GBs being substantially greater than the requested amount of 21 GBs (e.g., to avoid rejecting the request or performing a cold start at a much higher latency), or (iii) create a new sub-pool of compute instances with 24 GBs (or the requested amount of 21 GBs) of memory that can better handle this type of incoming requests than the two existing sub-pools.

Although the memory amount was used in this example, the decision to deny the code execution request, to handle the code execution request with overprovisioned compute capacity, or create a new sub-pool may depend on (i) how close the requested amount of compute resources is to existing amounts of compute resources, (ii) whether the requested resource configuration includes one or more types of resources not supported by the existing compute resources (e.g., if a code execution request (or a threshold number of code execution requests) requests a compute instance with a GPU and the existing pools do not include any compute instances with a GPU, the container service 140 may create a new sub-pool of compute instances with a GPU to handle the code execution request or to handle similar code execution requests in the future), (iii) whether the requested amount of compute resources can be provided by a compute instance in the existing pools (e.g., if a code execution request (or a threshold number of code execution requests) requests a compute instance with more than 32 GBs of memory and the existing pools do not include any compute instances with more than 32 GBs of memory, the container service 140 may create a new sub-pool of compute instances with more than 32 GBs of memory to handle the code execution request or to handle similar code execution requests in the future).

In scenario (i) in the example above, the container service 140 may store data indicating that a code execution request associated with 21 GBs of memory was received, but the code execution request was denied due to the lack of available capacity or due to the warm pool 143 not having compute capacity with a resource amount close to the requested amount (e.g., 16 GB instances are too small, and 32 GB instances are too big). If the container service 140 determines, based on the stored data, that a threshold number of code executions requesting 21 GBs of memory (or in the 20-28 GB range) have been received, the container service 140, based on this determination, may create a new sub-pool including compute instances that can better serve code execution requests in this range.

In scenario (ii) in the example above, the container service 140 may store data indicating that a code execution request associated with 21 GBs of memory was received and directed to the sub-pool of compute instances having 32 GBs memory. The data may also indicate the gap or ratio between the resource amount on the compute instance to which the code execution request was directed and the resource amount requested by the code execution request (e.g., that it was overprovisioned by 52%). The container service 140 may, based on the stored data indicating that a threshold number of code execution requests have been handled by compute instances that contain disproportionately large amounts of resources, create a new sub-pool including compute instances that can better serve such code execution requests (e.g., so that the gap or the ratio is reduced).

In scenario (iii) in the example above, the container service 140 may store data indicating that a code execution request associated with 21 GBs of memory was received and a new sub-pool of compute instances having 24 GBs memory was created to handle the code execution request.

At block 208, the container service 140 determines whether a condition for creating a new pool is met. If the container service 140 determines that the condition is met, the routine 200 proceeds to block 210, where the container service 140 initializes a new compute instance that can be used to execute the user code, and then, at block 212, executes the user code on the new compute instance. If the container service 140 determines that the condition is not met, the routine 200 proceeds to block 214.

At block 214, the container service 140 creates a new pool having a generational indicator different than that of the existing pool. For example, the new pool may have one generational indicator that indicates that the new pool is a brand-new pool with no or little usage history, and the existing pool may have another generational indicator that indicates that the existing pool is older and/or has experienced a greater amount of use over time than the new pool.

At block 216, the container service 140 initializes a new compute instance having a different capacity configuration than the compute instances in the existing pool (or than the compute instances that would be added to the existing pool). For example, the existing pool may not include any instances with a GPU, and the new compute instance initialized at block 216 may include a GPU. In such an example, the request received at block 202 may have specified that the user code should be executed on a compute instance having a GPU. As another example, the existing pool may not include any instances with more than 32 GBs of memory, and the new compute instance initialized at block 216 may include 128 GBs of memory. In such an example, the request received at block 202 may have specified that the user code should be executed on a compute instance having at least 128 GBs of memory.

At block 218, the container service 140 executes the user code on the new compute instance. The routine 200 may then end. Although not shown in FIG. 2, in some cases, as discussed above, the container service 140 may reject the code execution request based on not having pre-warmed compute capacity that can be used to handle the code execution request or based on the available pre-warmed compute capacity not being a great fit (e.g., too large) for the code execution request.

The routine 200 can include fewer, more, or different blocks than those illustrated in FIG. 2 and/or one or more blocks illustrated in FIG. 2 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Creating a New Pool of Compute Instances

Figure 3:
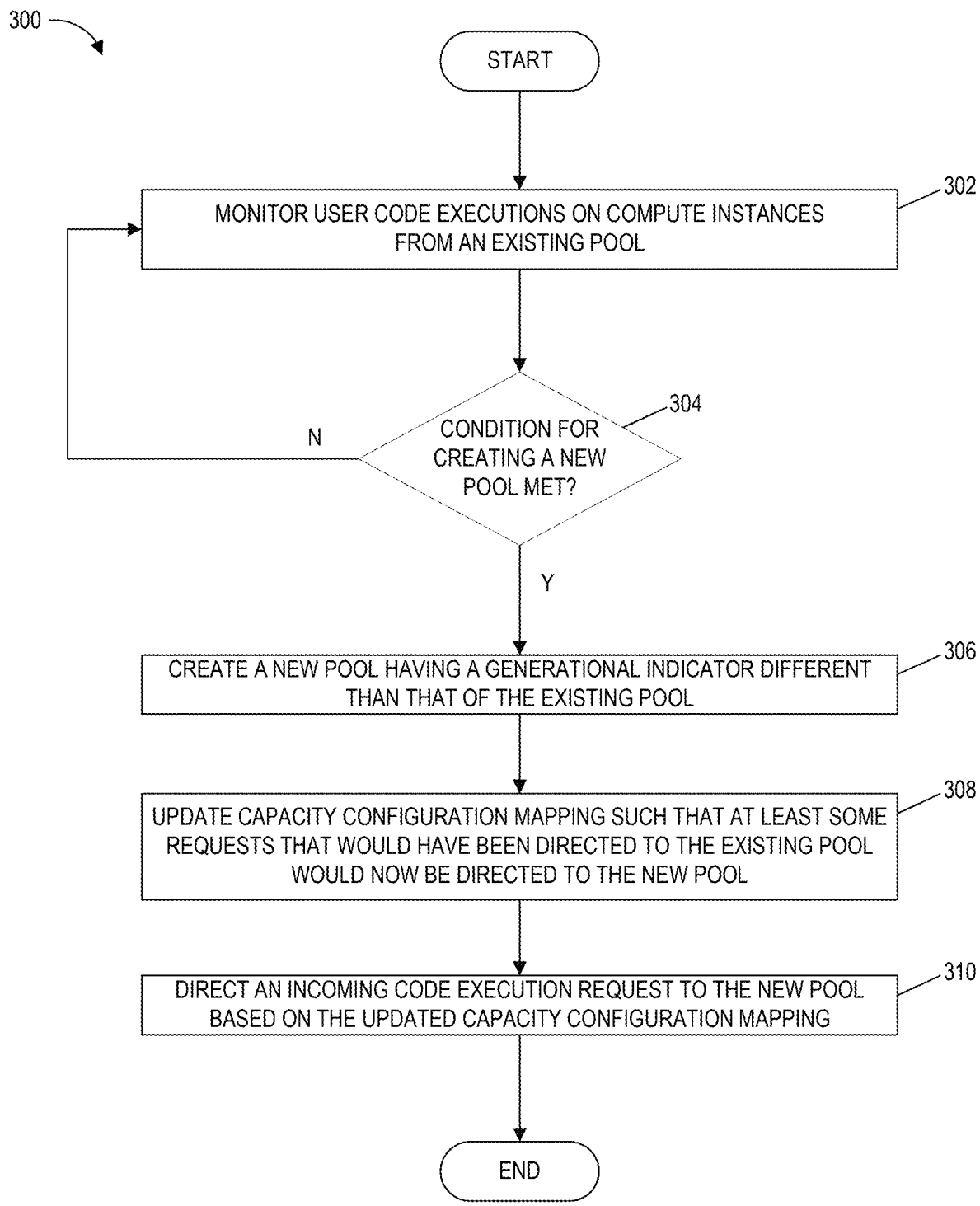
FIG. 3 is a flowchart of an example process for creating a new pool of compute instances in accordance with aspects of the present disclosure.

FIG. 3 depicts an illustrative routine 300 for creating a new pool of compute instances in accordance with aspects of the present disclosure. The routine 300 may be carried out, for example, by the container service 140 (or a component thereof such as the generational pool manager 142) or one or more other components of the cloud provider network 120 described herein. For convenience, some or all of the steps of the routine 300 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the container service 140 monitors user code executions on compute instances from an existing pool. For example, the container service 140 may access the resource utilization data 142B and determine the utilization levels and usage trends of the sub-pools in the warm pool 143 and the user code executions on the compute instances therein.

At block 304, the container service 140 determines whether a condition for creating a new pool is met. If the container service 140 determines that the condition is not met, the routine 300 returns to block 302 to continue monitoring the user code executions. If the container service 140 determines that the condition is met, the routine 300 proceeds to block 306.

At block 306, the container service 140 creates a new pool having a generational indicator different than that of the existing pool. For example, the new pool may have one generational indicator that indicates that the new pool is a brand-new pool with no or little usage history, and the existing pool may have another generational indicator that indicates that the existing pool is older and/or has experienced a greater amount of use over time than the new pool.

At block 308, the container service 140 updates the capacity configuration mapping that is used to place code executions on compute instances, such that at least some of the requests that would have been directed to the existing pool (prior to the creation of the new pool) would now be directed to the new pool.

At block 310, the container service 140 directs an incoming code execution request to the new pool based on the updated capacity configuration mapping. The routine 300 may then end.

The routine 300 can include fewer, more, or different blocks than those illustrated in FIG. 3 and/or one or more blocks illustrated in FIG. 3 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Removing an Existing Pool of Compute Instances

Figure 4:
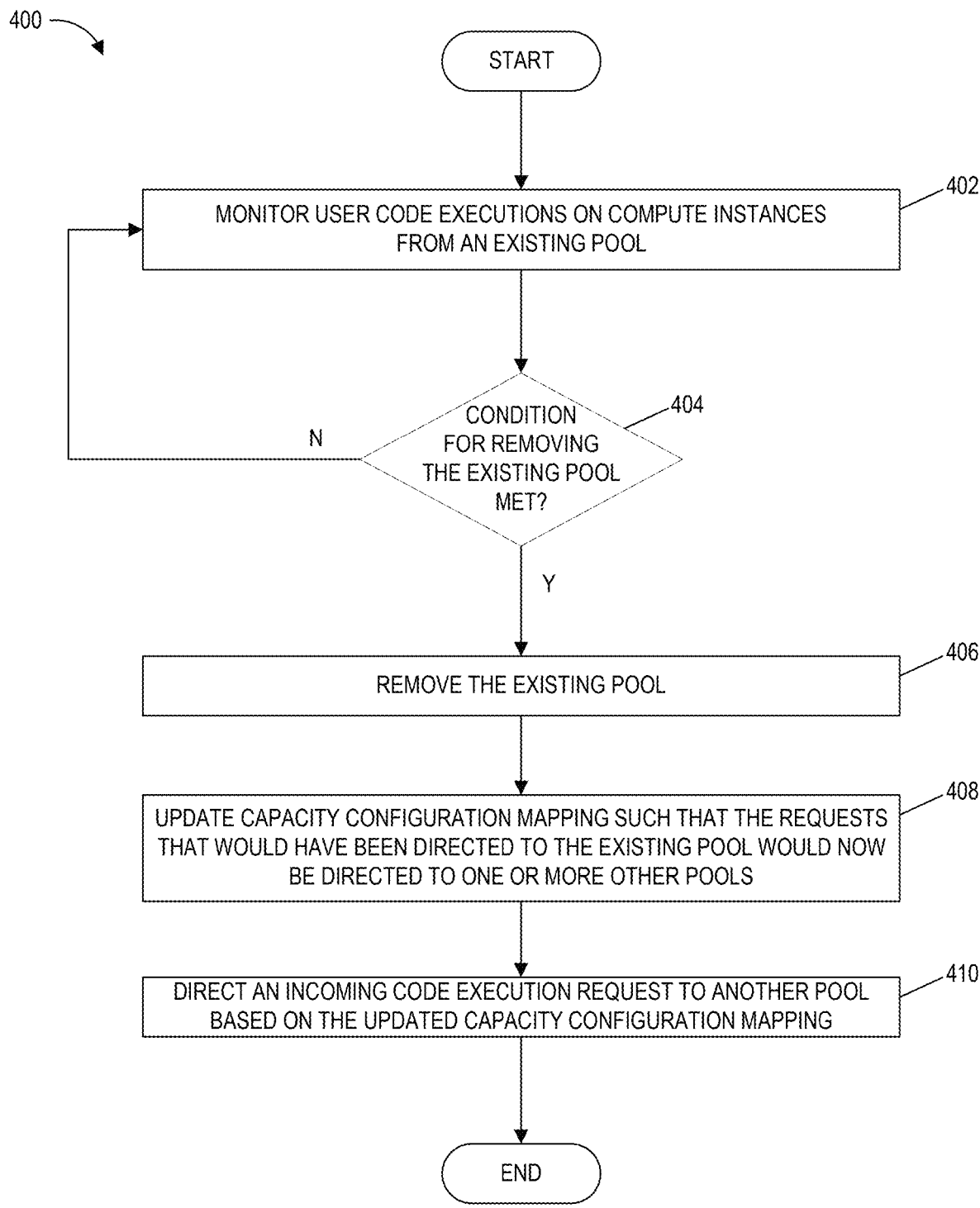
FIG. 4 is a flowchart of an example process for removing a new pool of compute instances in accordance with aspects of the present disclosure.

FIG. 4 depicts an illustrative routine 400 for creating a new pool of compute instances in accordance with aspects of the present disclosure. The routine 400 may be carried out, for example, by the container service 140 (or a component thereof such as the generational pool manager 142) or one or more other components of the cloud provider network 120 described herein. For convenience, some or all of the steps of the routine 400 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the container service 140 monitors user code executions on compute instances from an existing pool. For example, the container service 140 may access the resource utilization data 142B and determine the utilization levels and usage trends of the sub-pools in the warm pool 143 and the user code executions on the compute instances therein.

At block 404, the container service 140 determines whether a condition for removing the existing pool is met. If the container service 140 determines that the condition is not met, the routine 400 returns to block 402 to continue monitoring the user code executions. If the container service 140 determines that the condition is met, the routine 400 proceeds to block 406.

At block 406, the container service 140 removes the existing pool. If the existing pool has pre-warmed compute instances, those instances may also be terminated.

At block 408, the container service 140 updates the capacity configuration mapping that is used to place code executions on compute instances, such that the requests that would have been directed to the existing pool (prior to the removal of the existing pool) would now be directed to one or more other pools.

At block 410, the container service 140 directs an incoming code execution request to another pool based on the updated capacity configuration mapping. The routine 400 may then end.

The routine 400 can include fewer, more, or different blocks than those illustrated in FIG. 4 and/or one or more blocks illustrated in FIG. 4 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Promoting a Generational Pool of Compute Instances

Figure 5:
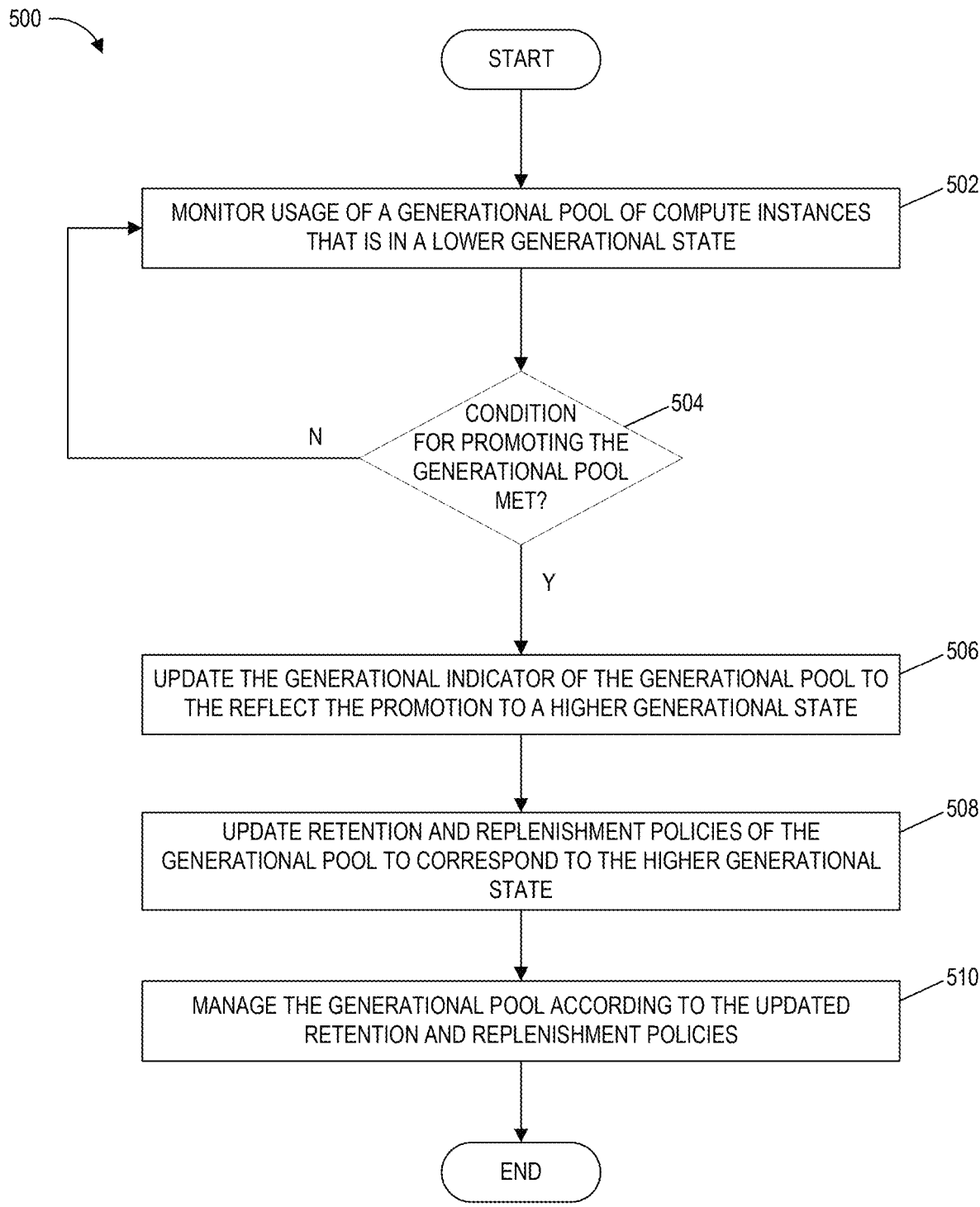
FIG. 5 is a flowchart of an example process for promoting a generational pool of compute instances in accordance with aspects of the present disclosure.

FIG. 5 depicts an illustrative routine 500 for creating a new pool of compute instances in accordance with aspects of the present disclosure. The routine 500 may be carried out, for example, by the container service 140 (or a component thereof such as the generational pool manager 142) or one or more other components of the cloud provider network 120 described herein. For convenience, some or all of the steps of the routine 500 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the container service 140 monitors usage of a generational pool of compute instances that is in a lower generational state. The usage of the generational pool may include the frequency at which incoming code execution requests are handled using compute capacity from the generational pool.

At block 504, the container service 140 determines whether a condition for promoting the generational pool is met. If the container service 140 determines that the condition is not met, the routine 500 returns to block 502 to continue monitoring the usage of the generational pool. If the container service 140 determines that the condition is met, the routine 500 proceeds to block 506.

At block 506, the container service 140 updates the generational indicator associated with the generational pool to reflect its promotion to a higher generational state.

At block 508, the container service 140 updates retention and replenishment policies associated with the generational pool to correspond to the higher generational state. For example, a generational pool in a lower generational state may have a retention policy that favors terminating the compute instances in the generational pool sooner rather than later after use, and a replenishment policy that favors keeping a fewer number of idle compute instances in anticipation of future code execution requests, whereas a generational pool with a higher generational state may have a retention policy that favors keeping the compute instances around for a little longer after use (with the hope of being able to use them again to handle future code execution requests), and a replenishment policy that favors keeping a greater number of idle compute instances in anticipation of future code execution requests. In some embodiments, there may be multiple levels of generational states with retention and replenishment policies gradually exhibiting this change. Additional details relating to resource replenishment are provided, for example, in U.S. application Ser. No. 16/909, 756, titled "REPLENISHEIENT-AWARE RESOURCE USAGE MANAGEMENT," which is incorporated herein by reference in its entirety.

At block 510, the container service 140 manages the generational pool according to the updated retention and replenishment policies. The routine 500 may then end.

The routine 500 can include fewer, more, or different blocks than those illustrated in FIG. 5 and/or one or more blocks illustrated in FIG. 5 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Promoting a Generational Pool of Compute Instances

Figure 6:
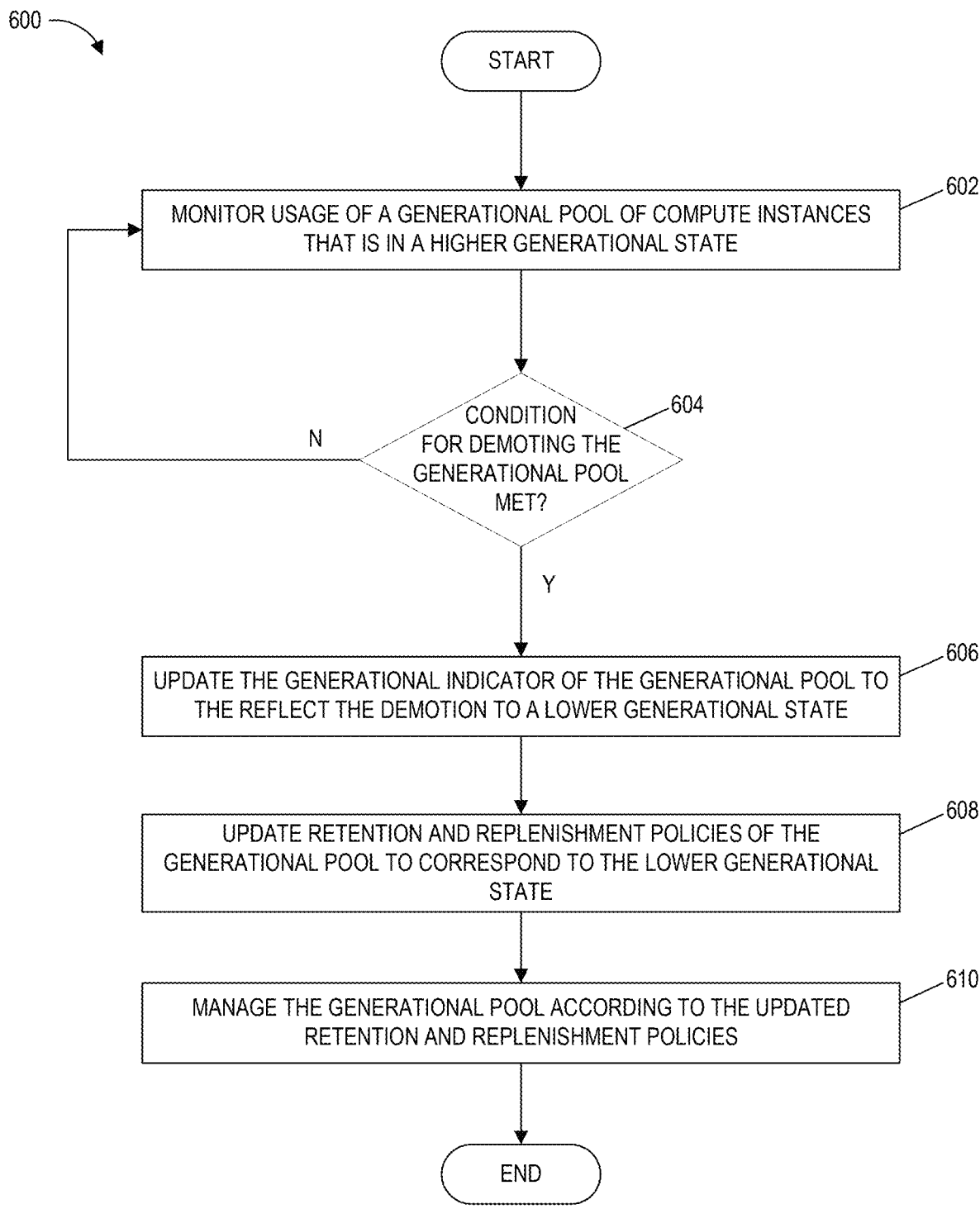
FIG. 6 is a flowchart of an example process for demoting a generational pool of compute instances in accordance with aspects of the present disclosure.

FIG. 6 depicts an illustrative routine 600 for creating a new pool of compute instances in accordance with aspects of the present disclosure. The routine 600 may be carried out, for example, by the container service 140 (or a component thereof such as the generational pool manager 142) or one or more other components of the cloud provider network 120 described herein. For convenience, some or all of the steps of the routine 600 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the container service 140 monitors usage of a generational pool of compute instances that is in a lower generational state. The usage of the generational pool may include the frequency at which incoming code execution requests are handled using compute capacity from the generational pool.

At block 604, the container service 140 determines whether a condition for promoting the generational pool is met. If the container service 140 determines that the condition is not met, the routine 600 returns to block 602 to continue monitoring the usage of the generational pool. If the container service 140 determines that the condition is met, the routine 600 proceeds to block 606.

At block 606, the container service 140 updates the generational indicator associated with the generational pool to reflect its promotion to a higher generational state.

At block 608, the container service 140 updates retention and replenishment policies associated with the generational pool to correspond to the higher generational state. For example, a generational pool in a lower generational state may have a retention policy that favors terminating the compute instances in the generational pool sooner rather than later after use, and a replenishment policy that favors keeping a fewer number of idle compute instances in anticipation of future code execution requests, whereas a generational pool with a higher generational state may have a retention policy that favors keeping the compute instances around for a little longer after use (with the hope of being able to use them again to handle future code execution requests), and a replenishment policy that favors keeping a greater number of idle compute instances in anticipation of future code execution requests. In some embodiments, there may be multiple levels of generational states with retention and replenishment policies gradually exhibiting this change.

At block 610, the container service 140 manages the generational pool according to the updated retention and replenishment policies. The routine 600 may then end.

The routine 600 can include fewer, more, or different blocks than those illustrated in FIG. 6 and/or one or more blocks illustrated in FIG. 6 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 7:
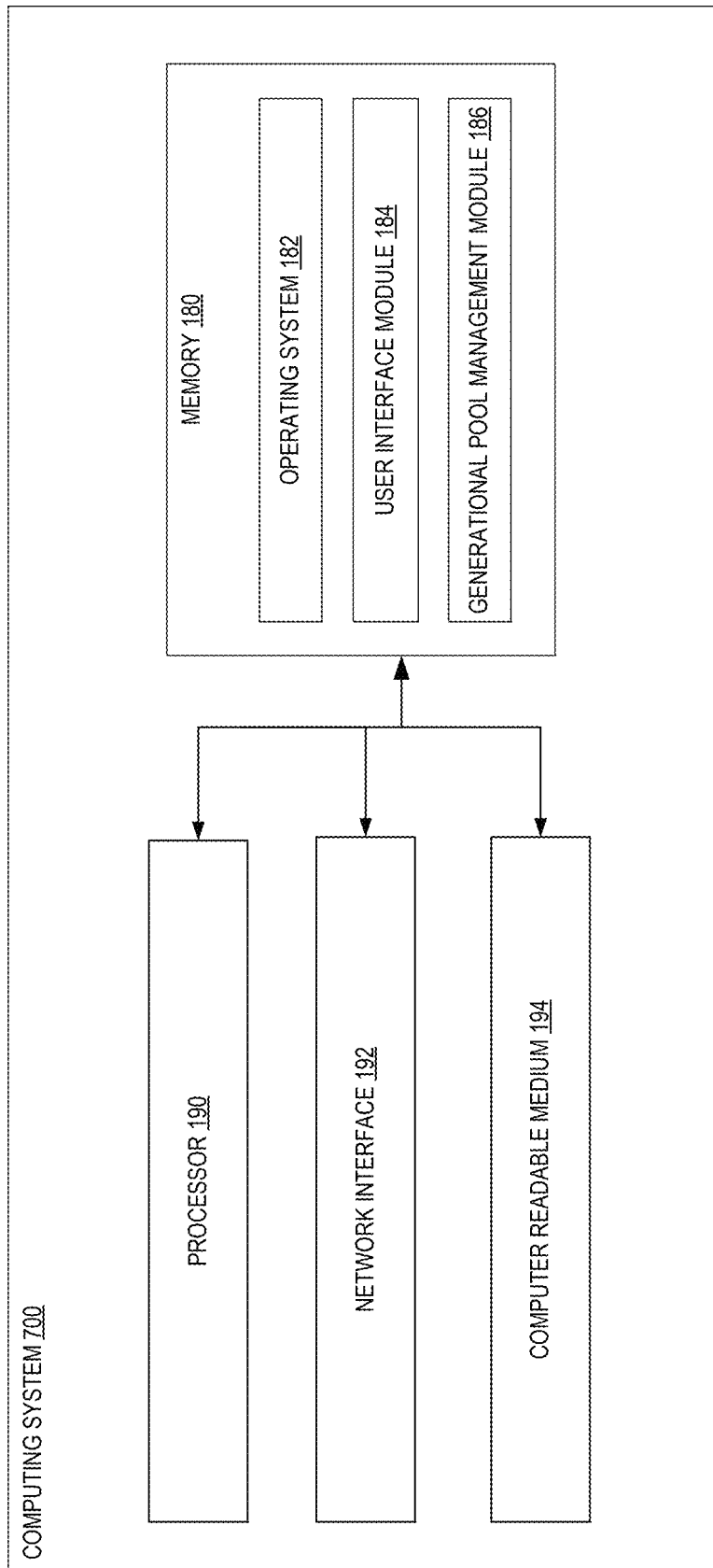
FIG. 7 depicts a general architecture of a computing device or system usable to implement one or more components descried herein, in accordance with aspects of the present disclosure.

FIG. 7 depicts an example architecture of a computing system 700 that can be used to perform one or more of the techniques described herein or illustrated in FIGS. 1-6. The general architecture of the computing system 700 depicted in FIG. 7 includes an arrangement of computer hardware and software modules that may be used to implement one or more aspects of the present disclosure. The computing system 700 may include many more (or fewer) elements than those shown in FIG. 7. It is not necessary, however, that all of these elements be shown in order to provide an enabling disclosure. For example, the computing system 700 may be used to implement one or more of the elements described herein, including the block store servers 105, the object storage servers 110, the encryption servers 115, and/or the user computing devices 102.

As illustrated, the computing system 700 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 700. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a generational pool management module 186 that may be executed by the processor 190. In one embodiment, the generational pool management module 186 implements various aspects of the present disclosure, e.g., those illustrated in FIGS. 1-6 or described with reference to FIGS. 1-6.

Although a single processor, a single network interface, a single computer-readable medium, and a single memory are illustrated in the example of FIG. 7, in other implementations, the computing system 700 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a warm pool of virtual machines, wherein each virtual machine in the warm pool is usable to execute a task in response to an incoming request to execute the task, and the warm pool is divided into a plurality of sub-pools; and a container service comprising computer hardware, wherein the container service is configured to manage and utilize the warm pool of virtual machines and is further configured to at least: receive a request to execute a user code on a virtual machine in the warm pool on behalf of a user, wherein the request includes capacity configuration information indicating an amount of computing resources requested for executing the user code; determine that a condition for creating an additional sub-pool in the warm pool is satisfied; create an additional sub-pool having a generational indicator that indicates that the additional sub-pool is new, wherein the generational indicator is different from that of at least one of the plurality of sub-pools; update capacity configuration mapping information associated with the warm pool such that at least one code execution request that would have been directed to one of the plurality of sub-pools prior to the creation of the additional sub-pool would now be directed to the additional sub-pool; initialize an additional virtual machine having a capacity configuration that is different from at least one of the virtual machines in the warm pool; and cause the user code to be executed on the additional virtual machine.

EI 2: The cloud provider system of EI 1, wherein the container service is further configured to: determine that a threshold number of code execution requests have been processed using virtual machines from the additional sub-pool; and update the generational indicator associated with the additional sub-pool to another value that indicates that the additional sub-pool is no longer new.

EI 3: The cloud provider system of EI 2, wherein the container service is further configured to update a replenishment policy associated with the additional sub-pool to correspond to the updated generational indicator, wherein the updated replenishment policy is different from that associated with at least one other sub-pool in the warm pool.

EI 4: The cloud provider system of EI 3, wherein the container service is further configured to control the number of virtual machines in the additional sub-pool according to the updated replenishment policy associated with the additional sub-pool such that an increased number of pre-warmed virtual machines are maintained in the additional sub-pool than prior to the updating of the replenishment policy.

EI 5: A computer-implemented method comprising: providing a pool of compute instances, wherein the compute instances in the pool are divided into a plurality of sub-pools; receiving a request to execute a user code on behalf of a user, wherein the request includes capacity configuration information indicating an amount of computing resources requested for executing the user code; determining that a condition for creating an additional sub-pool in the pool of compute instances is satisfied; creating an additional sub-pool having a generational indicator that indicates that the additional sub-pool is in a first generational state, wherein the generational indicator is different from that of at least one other sub-pool in the pool of compute instances; initializing an additional compute instance having a capacity configuration that is different from at least one of the compute instances in the pool; and executing the user code on the additional compute instance.

EI 6: The computer-implemented method of EI 5, further comprising: determining that a condition for updating the generational indicator associated with the additional sub-pool is satisfied; and updating the generational indicator associated with the additional sub-pool to another value that indicates that the additional sub-pool is in a second generational state different from the first generational state.

EI 7: The computer-implemented method of EI 5, wherein the additional sub-pool is associated with a replenishment policy corresponding to the first generational state, wherein the replenishment policy indicates a number of compute instances to be maintained in the additional sub-pool.

EI 8: The computer-implemented method of EI 7, further comprising: determining that the replenishment policy associated with the additional sub-pool has been updated; and causing the number of compute instances maintained in the additional sub-pool according to the updated replenishment policy associated with the additional sub-pool.

EI 9: The computer-implemented method of EI 5, further comprising updating capacity configuration mapping information associated with the pool of compute instances such that at least one code execution request that would have been directed to one of the plurality of sub-pools prior to the creation of the additional sub-pool would now be directed to the additional sub-pool.

EI 10: The computer-implemented method of EI 9, further comprising directing an incoming code execution request to the additional sub-pool based on the updated capacity configuration mapping information associated with the pool of compute instances.

EI 11: The computer-implemented method of EI 5, wherein the condition for creating an additional sub-pool comprises determining that the capacity configuration information included in the request does not match any of the compute instances in the pool.

EI 12: The computer-implemented method of EI 5, wherein the additional compute instance is one of a virtual machine instance, a bare-metal instance, a physical machine, a container, a node, an offload card, an IoT device, or on-premises compute capacity.

EI 13: A non-transitory computer-readable medium storing instructions that, when executed by a computing system within a cloud provider network, cause the computing system to perform operations comprising: providing a pool of compute instances, wherein the compute instances in the pool are divided into a plurality of sub-pools; receiving a request to execute a user code on behalf of a user, wherein the request includes capacity configuration information indicating an amount of computing resources requested for executing the user code; determining that a condition for creating an additional sub-pool in the pool of compute instances is satisfied; creating an additional sub-pool having a generational indicator that indicates that the additional sub-pool is in a first generational state, wherein the generational indicator is different from that of at least one other sub-pool in the pool of compute instances; initializing an additional compute instance having a capacity configuration that is different from at least one of the compute instances in the pool; and executing the user code on the additional compute instance.

EI 14: The non-transitory computer-readable medium of EI 13, storing further instructions that, when executed by the computing system, cause the computing system to perform operations comprising: determining that a condition for updating the generational indicator associated with the additional sub-pool is satisfied; and updating the generational indicator associated with the additional sub-pool to another value that indicates that the additional sub-pool is in a second generational state different from the first generational state.

EI 15: The non-transitory computer-readable medium of EI 13, wherein the additional sub-pool is associated with a replenishment policy corresponding to the first generational state, wherein the replenishment policy indicates a number of compute instances to be maintained in the additional sub-pool.

EI 16: The non-transitory computer-readable medium of EI 15, storing further instructions that, when executed by the computing system, cause the computing system to perform operations comprising: determining that the replenishment policy associated with the additional sub-pool has been updated; and causing the number of compute instances maintained in the additional sub-pool according to the updated replenishment policy associated with the additional sub-pool.

EI 17: The non-transitory computer-readable medium of EI 13, storing further instructions that, when executed by the computing system, cause the computing system to perform operations comprising updating capacity configuration mapping information associated with the pool of compute instances such that at least one code execution request that would have been directed to one of the plurality of sub-pools prior to the creation of the additional sub-pool would now be directed to the additional sub-pool.

EI 18: The non-transitory computer-readable medium of EI 17, storing further instructions that, when executed by the computing system, cause the computing system to perform operations comprising directing an incoming code execution request to the additional sub-pool based on the updated capacity configuration mapping information associated with the pool of compute instances.

EI 19: The non-transitory computer-readable medium of EI 13, wherein the condition for creating an additional sub-pool comprises determining that the capacity configuration information included in the request should be handled by a compute instance type associated with the additional compute instance.

EI 20: The non-transitory computer-readable medium of EI 13, wherein the additional compute instance is one of a virtual machine instance, a bare-metal instance, a physical machine, a container, a node, an offload card, an IoT device, or on-premises compute capacity.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a pool of virtual machines, wherein each virtual machine in the pool is usable to execute a task in response to an incoming request to execute the task, and the pool is divided into a plurality of sub-pools, wherein the plurality of sub-pools include at least a first sub-pool and a second sub-pool; and
   a container service comprising computer hardware, wherein the container service is configured to manage and utilize the pool of virtual machines and is further configured to at least:
      receive a request to execute a user code on a virtual machine in the pool on behalf of a user, wherein the request includes capacity configuration information indicating a type of computing resource and an amount of computing resource corresponding to the type of computing resource requested for executing the user code;
      determine, based at least partly on (i) the amount of computing resource indicated by the capacity configuration information exceeding a first amount or range of amounts of computing resource provided by one or more individual compute instances within the first sub-pool and also exceeding a second amount or range of amounts of computing resource provided by one or more individual compute instances within the second sub-pool and different from the first amount or range of amounts provided by the one or more individual compute instances within the first sub-pool, or (ii) the type of computing resource indicated by the capacity configuration information not being supported by one or more individual compute instances within the first sub-pool and one or more individual compute instances within the second sub-pool, that a condition for adding an additional sub-pool to the pool of compute instances such that a total amount of computing resource in the pool is increased is satisfied;
      create an additional sub-pool having a generational indicator that indicates that the additional sub-pool is new, wherein the generational indicator of the additional sub-pool is different from a generational indicator of at least one of the plurality of sub-pools;
      update capacity configuration mapping information associated with the pool such that at least one code execution request that would have been directed to one of the plurality of sub-pools prior to the creation of the additional sub-pool would now be directed to the additional sub-pool;
      initialize an additional virtual machine having a capacity configuration that is different from at least one of the virtual machines in the pool; and
      cause the user code to be executed on the additional virtual machine.

2. The cloud provider system of claim 1, wherein the container service is further configured to:
   determine that a threshold number of code execution requests have been processed using virtual machines from the additional sub-pool; and
   update the generational indicator associated with the additional sub-pool to another value that indicates that the additional sub-pool is no longer new.

3. The cloud provider system of claim 2, wherein the container service is further configured to update a replenishment policy associated with the additional sub-pool to correspond to the updated generational indicator, wherein the updated replenishment policy is different from that associated with at least one other sub-pool in the pool.

4. The cloud provider system of claim 3, wherein the container service is further configured to control the number of virtual machines in the additional sub-pool according to the updated replenishment policy associated with the additional sub-pool such that an increased number of pre-initialized virtual machines are maintained in the additional sub-pool than prior to the updating of the replenishment policy.

5. A computer-implemented method comprising:
   providing a pool of compute instances, wherein the compute instances in the pool are divided into a plurality of sub-pools, wherein the plurality of sub-pools include at least a first sub-pool and a second sub-pool;
   receiving a request to execute a user code on behalf of a user, wherein the request includes capacity configuration information indicating a type of computing resource and an amount of computing resource corresponding to the type of computing resource requested for executing the user code;
   determining, based at least partly on (i) the amount of computing resource indicated by the capacity configuration information exceeding a first amount or range of amounts of computing resource provided by one or more individual compute instances within the first sub-pool and also exceeding a second amount or range of amounts of computing resource provided by one or more individual compute instances within the second sub-pool and different from the first amount or range of amounts provided by the one r more individual compute instances within the first sub-pool, or (ii) the type of computing resource indicated by the capacity configuration information not being supported by one or more individual compute instances within the first sub-pool and one or more individual compute instances within the second sub-pool, that a condition for adding an additional sub-pool to the pool of compute instances such that a total amount of computing resource in the pool is increased is satisfied;
   creating an additional sub-pool having a generational indicator that indicates that the additional sub-pool is in a first generational state, wherein the generational indicator of the additional sub-pool is different from a generational indicator of at least one other sub-pool in the pool of compute instances;

initializing an additional compute instance having a capacity configuration that is different from at least one of the compute instances in the pool; and executing the user code on the additional compute instance.

6. The computer-implemented method of claim 5, further comprising:

determining that a condition for updating the generational indicator associated with the additional sub-pool is satisfied; and updating the generational indicator associated with the additional sub-pool to another value that indicates that the additional sub-pool is in a second generational state different from the first generational state.

7. The computer-implemented method of claim 5, wherein the additional sub-pool is associated with a replenishment policy corresponding to the first generational state, wherein the replenishment policy indicates a number of compute instances to be maintained in the additional sub-pool.

8. The computer-implemented method of claim 7, further comprising:

determining that the replenishment policy associated with the additional sub-pool has been updated; and causing the number of compute instances maintained in the additional sub-pool according to the updated replenishment policy associated with the additional sub-pool.

9. The computer-implemented method of claim 5, further comprising updating capacity configuration mapping information associated with the pool of compute instances such that at least one code execution request that would have been directed to one of the plurality of sub-pools prior to the creation of the additional sub-pool would now be directed to the additional sub-pool.

10. The computer-implemented method of claim 9, further comprising directing an incoming code execution request to the additional sub-pool based on the updated capacity configuration mapping information associated with the pool of compute instances.

11. The computer-implemented method of claim 5, wherein the additional compute instance is one of a virtual machine instance, a bare-metal instance, a physical machine, a container, a node, an offload card, an IoT device, or on-premises compute capacity.

12. The computer-implemented method of claim 5, wherein the additional compute instance (i) provides an amount or range of amounts of computing resource greater than or equal to the amount of computing resource indicated by the capacity configuration information or (ii) supports the type of computing resource indicated by the capacity configuration information.

13. A non-transitory computer-readable medium storing instructions that, when executed by a computing system within a cloud provider network, cause the computing system to perform operations comprising:

providing a pool of compute instances, wherein the compute instances in the pool are divided into a plurality of sub-pools, wherein the plurality of sub-pools include at least a first sub-pool and a second sub-pool;

receiving a request to execute a user code on behalf of a user, wherein the request includes capacity configuration information indicating a type of computing resource and an amount of computing resource corresponding to the type of computing resource requested for executing the user code;

determining, based at least partly on (i) the amount of computing resource indicated by the capacity configuration information exceeding a first amount or range of amounts of computing resource provided by one or more individual compute instances within the first sub-pool and a second amount or range of amounts of computing resource provided by one or more individual compute instances within the second sub-pool and different from the first amount or range of amounts provided by the one or more individual compute instances within the first sub-pool, or (ii) the type of computing resource indicated by the capacity configuration information not being supported by one or more individual compute instances within the first sub-pool and one or more individual compute instances within the second sub-pool, that a condition for adding an additional sub-pool to the pool of compute instances such that a total amount of computing resource in the pool is increased is satisfied;

creating an additional sub-pool having a generational indicator that indicates that the additional sub-pool is in a first generational state, wherein the generational indicator of the additional sub-pool is different from a generational indicator of at least one other sub-pool in the pool of compute instances;

initializing an additional compute instance having a capacity configuration that is different from at least one of the compute instances in the pool; and executing the user code on the additional compute instance.

14. The non-transitory computer-readable medium of claim 13, storing further instructions that, when executed by the computing system, cause the computing system to perform operations comprising:

determining that a condition for updating the generational indicator associated with the additional sub-pool is satisfied; and updating the generational indicator associated with the additional sub-pool to another value that indicates that the additional sub-pool is in a second generational state different from the first generational state.

15. The non-transitory computer-readable medium of claim 13, wherein the additional sub-pool is associated with a replenishment policy corresponding to the first generational state, wherein the replenishment policy indicates a number of compute instances to be maintained in the additional sub-pool.

16. The non-transitory computer-readable medium of claim 15, storing further instructions that, when executed by the computing system, cause the computing system to perform operations comprising: determining that the replenishment policy associated with the additional sub-pool has been updated; and causing the number of compute instances maintained in the additional sub-pool according to the updated replenishment policy associated with the additional sub-pool.

17. The non-transitory computer-readable medium of claim 13, storing further instructions that, when executed by the computing system, cause the computing system to perform operations comprising updating capacity configuration mapping information associated with the pool of compute instances such that at least one code execution request that would have been directed to one of the plurality of sub-pools prior to the creation of the additional sub-pool would now be directed to the additional sub-pool.

18. The non-transitory computer-readable medium of claim 17, storing further instructions that, when executed by the computing system, cause the computing system to perform operations comprising directing an incoming code execution request to the additional sub-pool based on the updated capacity configuration mapping information associated with the pool of compute instances.

19. The non-transitory computer-readable medium of claim 13, wherein the additional compute instance is one of a virtual machine instance, a bare-metal instance, a physical machine, a container, a node, an offload card, an IoT device, or on-premises compute capacity.

20. The non-transitory computer-readable medium of claim 13, wherein the additional compute instance (i) provides an amount or range of amounts of computing resource greater than or equal to the amount of computing resource indicated by the capacity configuration information or (ii) supports the type of computing resource indicated by the capacity configuration information.

* * * * *